United States Patent [19]

Hechler IV et al.

[11] Patent Number: 4,832,072

[45] Date of Patent: May 23, 1989

[54] FLUID PROPORTIONING AND MIXING SYSTEM

[75] Inventors: Valentine Hechler IV, 26 Meadowview Dr., Northfield, Ill. 60093; Edward A. Schwall, Northbrook, Ill.

[73] Assignee: Valentine Hechler IV
[21] Appl. No.: 96,487
[22] Filed: Sep. 15, 1987
[51] Int. Cl.⁴ .............................................. G05D 11/03
[52] U.S. Cl. .................................... 137/99; 137/599.1
[58] Field of Search ................ 137/98, 99, 100, 599.1, 137/101.31; 417/343, 344, 368

[56] References Cited

U.S. PATENT DOCUMENTS

| | | | |
|---|---|---|---|
| 3,371,699 | 3/1968 | Riot | 137/98 X |
| 3,672,389 | 6/1972 | McConnell et al. | 137/99 |
| 3,749,525 | 7/1973 | Hooper et al. | 417/343 X |
| 3,865,126 | 2/1975 | Baggaley | 137/99 X |
| 3,934,604 | 1/1976 | Sanderson et al. | 137/98 |
| 4,033,371 | 7/1977 | Keedwell | 137/100 |
| 4,111,607 | 9/1978 | Tavor | 417/46 |
| 4,369,805 | 1/1983 | Tavor | 137/99 X |
| 4,651,765 | 3/1987 | Beth | 137/99 |

*Primary Examiner*—Stephen Hepperle
*Attorney, Agent, or Firm*—Sixbey, Friedman, Leedom & Ferguson

[57] ABSTRACT

The fluid proportioning and mixing unit includes a metering and pumping section and a mixer unit. The metering and pumping section is divided into a first solute section and a second section exclusively used for the conduction of motive fluid. At least two metering units extend between the first and second sections and operate to draw solute in through the first section and expel measured volumes of solute back into the first section. Simultaneously, the metering units receive motive fluid from the second section and expel motive fluid back into the second section. The expelled motive fluid is directed to an equalizer system which provides lift height compensation for the solute supply. A mixer unit receives measured volumes of solute from the first solute section and incorporates a ratio valve assembly to mix this solute with a base fluid in a variable preset ratio which is maintained by the ratio valve assembly.

29 Claims, 5 Drawing Sheets

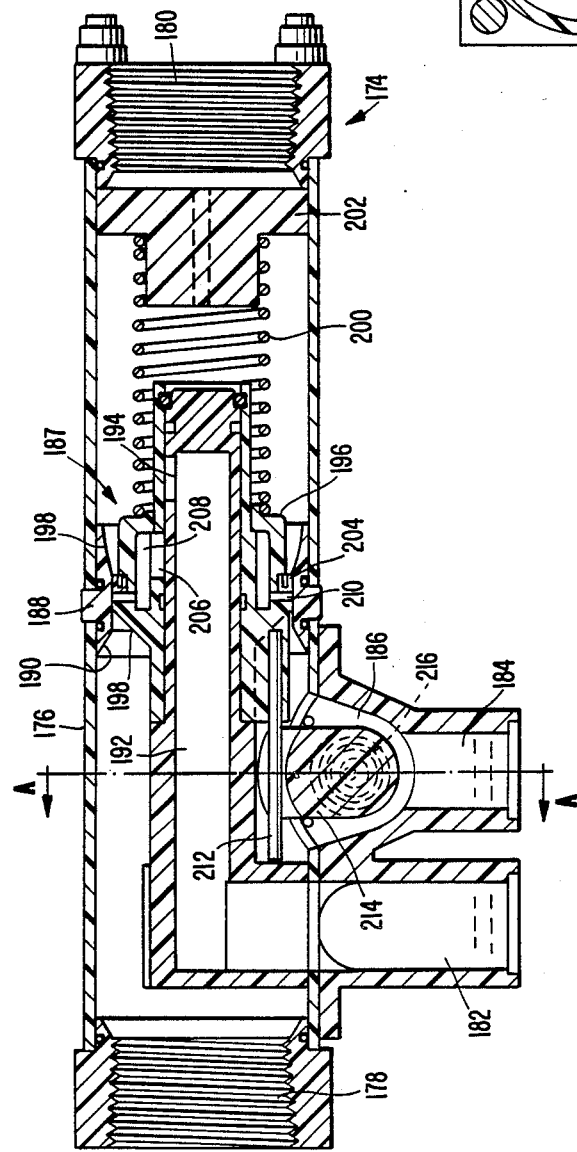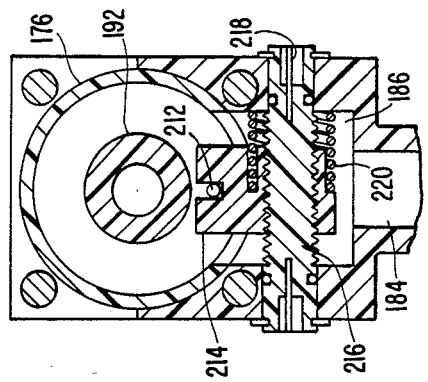

FLUID PROPORTIONING AND MIXING SYSTEM

TECHNICAL FIELD

The present invention relates to fluid proportioning and mixing systems generally, and more particularly to an improved system for accurately proportioning a miscible solute in a water or other suitable solvent under continuous flow.

BACKGROUND ART

In recent years, the growth of the nursery and lawn care industries has created a demand for compact, inexpensive yet accurate fluid proportioning and mixing systems. Ideally, a system of this type should operate effectively to mix, in a preset proportion, a chemical with a stream of solvent, such as water, and the ratio of chemical to water must be accurately maintained for a normal range of variables which affect both the water and chemical supplies. The system should accommodate both a wide range of primary flows and also provide the ability to adjust readily and continuously the proportioning ratio over a range of continuously desirable settings. In addition, the proportioning and mixing unit must be compact and formed of material which is both inert to a wide range of chemical ingredients normally mixed with water and which remains operative over a wide range of temperatures. The device should be driven by power derived from the water supply without creating a substantial pressure drop in the water supplied as a solvent, and the water supply should be positively protected from backflow contamination by the chemical used as a solute.

Previous proportioning and mixing systems have been designed to meet and satisfy some of the requirements for an ideal system, but none to this point has successfully met all such requirements. For example, relatively effective but inexpensive Venturi type proportioning and mixing systems have been developed as illustrated by U.S. Pat. Nos. 4,174,812, 4,247,046 and 4,277,030 to V. Hechler. These devices are compact and portable, and maintain mixing ratios within acceptable ranges for many applications. However, Venturi units are essentially fixed flow devices and not readily adjustable for proportioning ratio. They are also often subject to ratio variations caused by a number of variables such as solute viscosity, pressure and temperature variations in the supplied solute and solvent, and nozzle deterioration caused by contamination and chemical action.

More expensive pump type proportioning and mixing systems have been designed which are more accurate than the Venturi mixers and proportioners, for these pump type units positively measure the chemical solute in a measuring chamber having a defined volumetric capacity. Most pump type units include an alternator driven by the input water for the device which controls the direction of movement of two pistons individually mounted in one of two similar measuring chambers. The alternator may consist of two parallel spool valves, each of which operates selectively in response to water pressure to either direct water into a measuring chamber behind a piston or to vent water from the measuring chamber to an output. The pistons are interconnected by a cord or other mechanical connection, and when one measuring chamber is receiving water through a spool valve, the second is venting water through the remaining spool valve to the output. As water is vented, the piston draws a measured volume of solute into the measuring chamber, while the water entering the remaining measuring chamber causes the piston therein to expel to a mixer solute previously measured. A reversing switch mechanically actuated in response to piston position causes the spool valves to reverse operation when each piston reaches the extent of its travel within a respective measuring chamber.

Most pump type proportioning and mixing systems employ all water received from an external supply source to operate the alternator and to drive the pistons in the measuring chambers. Water expelled from the measuring chambers is directed to a mixer where it is mixed with solute provided from the measuring chambers. This use of all supply water results in excessive pressure losses in the water stream before it reaches the mixer, for all of the water supplied is required to travel the distances between the operating components of the unit as well as to provide the power for these operating components.

Attempts to use only a small portion of the supply water to power the alternator and pistons of prior pump type proportioning and mixing systems have met with only limited success, for the power available from this limited water supply is minimal. It has been necessary for the limited supply of drive water to travel through elongated tubes and conduits with an attendant pressure loss to reach the spaced working components of prior units, and the power remaining was often barely enough to drive the unit under ideal conditions. A factor which was likely to render inadequate the available power provided by the limited supply of drive water was the variable lift height effect which determines the energy necessary to lift the solute from a storage container to a measuring chamber.

In known pump type proportioning and mixing systems, where drive water is diverted from a main water stream, pressure losses in the main water stream still occur as it travels across the unit to an input valve for a mixer. Also, in such systems, destruction of the coupling unit between the two pistons is a common occurrence. When the solute supply tank is empty or when the system first begins to pump solute, air is drawn into one of the measuring chambers instead of solute. When this piston reverses to expel solute, it is opposed only by air, but the remaining piston is opposed by a solid column of water, and the resulting overload on the coupling mechanism between the two pistons often results in the destruction of the coupling mechanism.

Finally, pump type proportioning and mixing devices are generally large units including numerous fluid conducting tubes and passages, and this multiplicity of components increases the likelihood that some chemical solute will attack and destroy one or more components of the unit.

DISCLOSURE OF THE INVENTION

It is a primary object of the present invention to provide a novel and improved fluid proportioning and mixing system which is compact and formed of material which is inert to chemical solutes normally mixed with water. The device is molded from epoxy resins and activators which are not attacked by most solutes to form chemically inert plastic parts that possess great strength, rigidity and dimensional accuracy.

Another object of the present invention is to provide a novel and improved fluid proportioning and mixing system wherein the water to drive the system is diverted from the main water supply stream provided to the mixer for the system. Pressure losses in both the drive water and the water stream to the mixer are minimized by arranging all components responsive to drive water on one side of a body member for the system and all components for controlling and transmitting solute to a mixing chamber on the opposite side of the body member.

A further object of the present invention is to provide a novel and improved fluid proportioning and mixing system wherein a small portion of the input water to the system is diverted to power system components. This water is then directed to an equalizer container as displacement water to provide lift height compensation for the solute supply for the system.

Yet another object of the present invention is to provide a novel and improved fluid proportioning and mixing system, which includes a plurality of mixing chambers with alternately operating water powered pistons in adjacent chambers. The pistons are interconnected by cables connected to a control drum which has two spring loaded sections, each of which is connected to a piston cable. When air instead of solute is drawn into a mixing chamber, the drum sections are permitted to rotate relative to one another to relieve tension on the piston cables when the air is ejected.

A further object of the present invention is to provide a novel and improved fluid proportioning and mixing system which includes a mixing unit which cooperates with a separate metering and pumping section. The solute measured by the metering and pumping section is directed to a mixing control valve which controls the water-solute ratio. The valve is spring biased, and the cross-sectional area of the valve opening is varied with valve travel to offset increased spring pressure caused by compression of the biasing spring as the valve opens in such manner that this travel is in direct proportion to solute or solvent flow.

A still further object of the present invention is to provide a novel and improved fluid proportioning and mixing system which includes a unique alternator valve to control the direction of movement of two metering pistons. This alternator valve operates effectively as a single spool valve but is formed by two valve sections joined at one end by a coupling mechanism.

BRIEF DESCRIPTION OF THE DRAWINGS

FIG. 6 is a sectional view of the mixer unit for the fluid proportioning and mixing system of FIG. 5; and FIG. 7 is a cross-sectional view of the mixer unit of FIG. 6 taken along lines A—A.

BEST MODE FOR CARRYING OUT THE INVENTION

Figure 1:
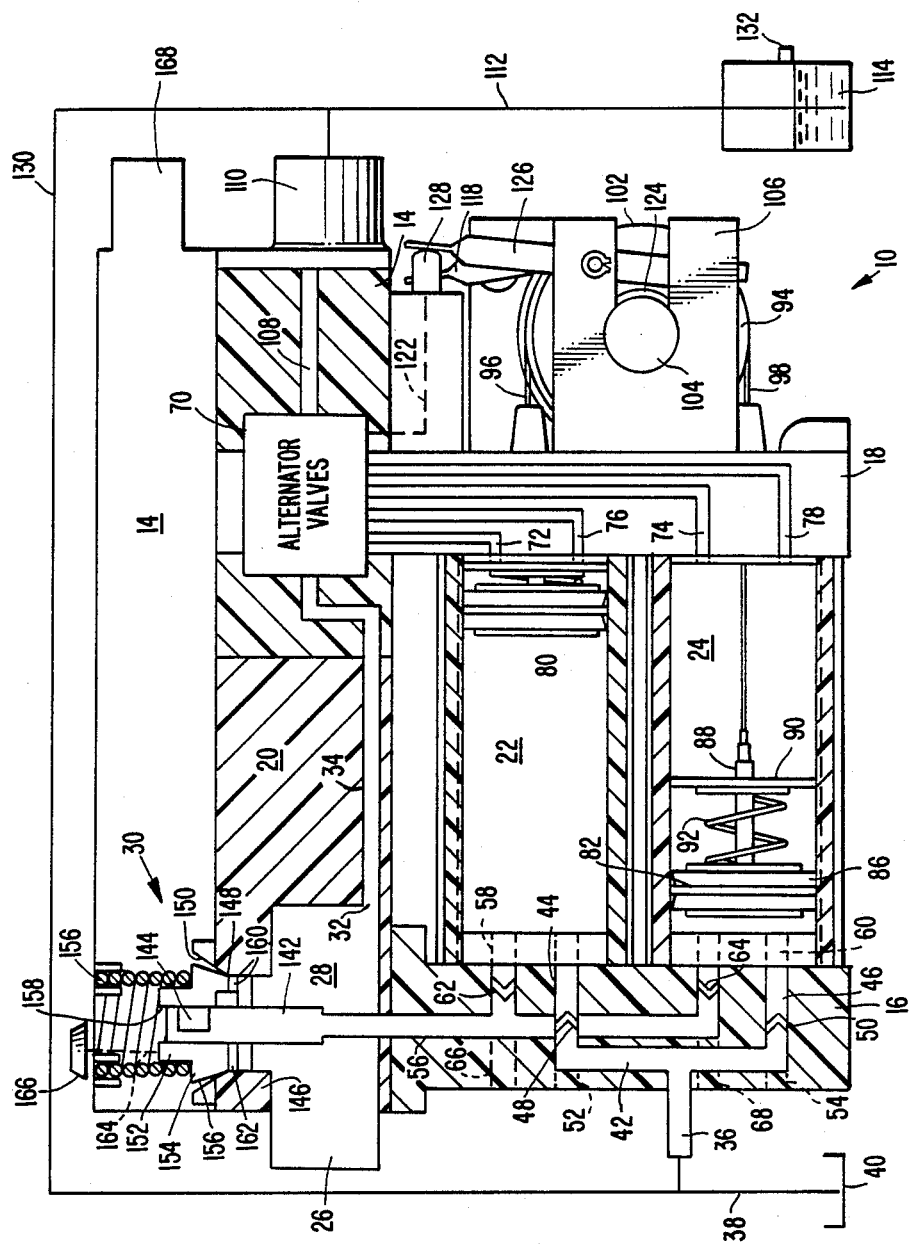
FIG. 1 is a sectional, partially diagrammatic view of the metering and pumping unit and metering unit for the fluid proportioning and mixing system of the present invention.

Referring now to the drawings, the fluid proportioning and mixing unit of the present invention indicated generally at 10 is formed from a metering and pumping unit 12 and a mixer unit 14. The mixer unit may be mounted directly on top of the metering and pumping unit, as illustrated in FIG. 1, or may be spaced above the metering and pumping unit so that the metering and pumping unit only may be completely enclosed in an external casing which provides additional shielding protection therefor. The mixer unit is spaced or mounted separately in cases where it is larger to permit greater solute flows.

The metering and pumping unit 12 includes a solute section 16, a motive fluid section 18 extending in spaced, substantially parallel relationship with the solute section, and a bridging section 20 which joins the solute and motive fluid sections. Extending between the solute and motive fluid sections beneath the bridging section 20 are first and second metering chambers 22 and 24, respectively.

The bridging section 20 is provided with a first fluid inlet port 26 to be connected to a source of fluid under pressure that will be mixed with a desired fluid chemical solute. Normally, this base fluid provided to the port 26 is water, and consequently the base fluid will be referred to as water throughout this application, although it should be recognized that other fluids to be mixed with a fluid solute can be used. Water passing through the inlet port 26 is received in an entry chamber 28, and most of this water passes from the inlet chamber through a ratio valve assembly 30 into the mixer unit 14. However, a small volume of the water under pressure from the inlet chamber 28 is divided from the main water input to the device by a restricted aperture 32. This restricted aperture permits a portion of the inlet water to be provided under pressure as motive fluid through a motive fluid supply conduit 34, which is formed in the bridging section 20. It is noteworthy that no water in any form passes into the solute section 16.

The solute section 16 includes a solute inlet port 36 which is connected by means of a solute line 38 to a solute supply container 40. The chemical in the container 40 is not under pressure, and may constitute any desired chemical in fluid form for mixture with the fluid passing through the inlet port 26. Any suitable container for the chemical supply may be used as the solute supply container 40, and for many chemical fertilizer applications, this container may constitute a simple open topped bucket.

The solute inlet port 36 communicates with a solute supply conduit 42 which in turn connects with first and second solute inlet conduits 44 and 46, respectively. The solute inlet conduit 44 opens into one end of the metering chamber 22, while the solute conduit 46 opens into the same end of the metering chamber 24. Vacuum responsive valves 48 and 50 are mounted in the solute inlet conduits 44 and 46, respectively, to control the flow of solute from the solute inlet port 36 to the metering chambers 22 and 24. The vacuum responsive valves 48 and 50 and their respective valve seats and spring biasing means are mounted in tubular housings, indicated in broken lines at 52 and 54, which are removably threaded into the face of the solute section 16. These valves are drawn away from their valve seats by a vacuum in the respective metering chambers 22 or 24 to permit solute to flow into a metering chamber.

The solute section 16 also includes a metered solute exit conduit 56 which joins solute outlet conduits 58 and 60 connected to the metering chambers 22 and 24, respectively. Mounted in the solute outlet conduits are pressure responsive valves 62 and 64 which move outwardly away from their respective valve seats against a bias spring in response to fluid pressure from the metering chambers 22 or 24. These pressure responsive valves, with their respective biasing springs and valve seats are mounted within housings 66 and 68, indicated in broken lines, which, like the housings 52 and 54 are threaded into the face of the solute section 16. Thus, the valves 48, 50, 62 and 64 may be easily removed from the solute section 16 for cleaning, repair or replacement.

It is important to note that all solute conduits and the solute section 16, and at all solute communication with the metering chambers 22 and 24 occurs at an end of such chambers adjacent the solute section.

The motive fluid in the motive fluid supply conduit 34 is provided to an alternator section 70 which includes alternator spool valves operative in response to the reception of motive fluid to control the entry and exit of motive fluid from the metering chambers 22 and 24. The spool valves 71 and 73 are caused to operate alternatively by a connecting rocker arm 75 and cycle in response to motive fluid fed to one of two control ports 77 or 79.

From the alternator 70, motive fluid inlet conduits 72 and 74 extend into the remaining ends of the metering chambers 22 and 24. Similarly, motive fluid exit conduits 76 and 78 extend from the same ends of the metering chambers 22 and 24 to the alternator 70.

Within the metering chambers 22 and 24 are pistons 80 and 82, respectively, which are of similar construction, and the structure of these pistons will be description includes a piston member 86 which seals against the internal walls of the respective metering chamber, and which has a central shaft 88 projecting therefrom. Mounted on the shaft 88 for movement toward and away from the piston 86 is a stop member 90 which is separated from the piston by a spring 92. The stop member 90 and the spring 92 provide cushioning for the piston when it is drawn against the end of the metering chamber adjacent the motive fluid section 18, as illustrated by the piston 80 in FIG. 1.

The pistons 80 and 82 are connected together by means of a rotatable drum 94 and cables 96 and 98 which are connected to the end of the central shaft 88 for the respective pistons. The drum 94 includes two separate drum sections 100 and 102 (FIG. 2) which are mounted upon a central shaft 104. This shaft is mounted for rotation by spaced mounting sections 106 secured to the motive fluid section 18.

One end of the cable 96 is fixed to the drum section 100, while one end of the cable 98 is fixed to the of the cables and the manner in which they are secured to the drum 94 assures that when the piston 80 is at the end of its stroke against the wall of the metering chamber 22, which is adjacent to the motive fluid section 18, the piston 82 will be against the opposite end wall of the metering chamber 24, which is adjacent to the solute section 16. Thus, the pistons 80 and 82 operate alternatively and move in opposite directions within the metering chambers 22 and 24.

Considering in greater detail the operation of the pistons 80 and 82, it will be noted that since the cables 96 and 98 are flexible, the pistons are operated entirely under the influence of motive fluid supplied by the alternator 70 which controls the operation of the pistons. For example, to drive the pistons in the direction indicated in FIG. 1, the alternator 70 is providing motive fluid from the motive fluid supply conduit 34 and the motive fluid inlet conduit 74 to the area of the metering chamber 24 behind the piston 82. At the same time, the alternator is closing off the exit conduit 78 from the metering chamber 24, and the motive fluid inlet conduit 72 for the metering chamber 22, while opening the exit conduit 76 for the metering chamber 22. When this occurs, the piston 82 begins to move to the left forcing the metered volume of solute in front of the piston which had been drawn into the metering chamber out through the pressure responsive valve 64, but the vacuum responsive valve 50 remains tightly closed. Movement of the piston 82 causes clockwise rotation of the drum 94 due to tension on the cable 98, and thus the cable 96 begins to draw the piston 80 to the right in FIG. 1. This movement of the piston 80 causes a vacuum which opens the vacuum responsive valve 48 and solute is drawn into the metering chamber 22. At the same time, the motive fluid which previously filled the metering chamber 22 behind the piston 80 is caused to exit through the motive fluid exit conduit 76 and the alternator 70 to a motive fluid exit conduit 108. This exiting motive fluid passes out through an outlet port 110 and through an equalizer line 112 to an equalizer container 114.

When the pistons 80 and 82 reach the end of the respective cycles shown in FIG. 1, the metering chamber 22 will be filled with a metered volume of solute determined by the volume of the metering chamber, while the metering chamber 24 will be filled with motive fluid. At this point, a cam 116 adjacent the drum section 100 which rotates with the drum 94 contacts a switch arm 118 which is pivoted on the mounting member 106 and causes the switch arm to depress a switch button 120. This switch button operates a control mechanism indicated in dotted lines at 122, to permit motive fluid to enter the control port 77 to cause the alternator spool valves within the alternator 70 to change position. Motive fluid is now fed by the alternator 70 to the motive fluid inlet conduit 72, while the alternator closes off the motive fluid exit conduit 76 and the motive fluid inlet conduit 74, and opens the motive fluid exit conduit 78. Now, the operation of the pistons 80 and 82 is reversed, and the piston 80 forces the previously measured solute out through the pressure responsive valve 62, while the piston 82 draws solute in through the vacuum responsive valve 50. At the same time, motive fluid from the metering chamber 24 is forced out through the motive fluid ex it conduit 78, the alternator valve 70, the motive fluid exit conduit 108, the motive fluid outlet port 110 and the equalizer line 112 to the equalizer container 114. When the pistons 80 and 82 reach the end of this next metering cycle, a cam 124 on the shaft 104 adjacent the drum section 102 contacts a switch arm 126 pivoted to the mounting unit 106 and causes the switch arm to depress a button 128. Now, the control mechanism 122 is caused to reverse the position of the alternator valves within the alternator 70, and a new metering cycle is begun.

Figure 2:
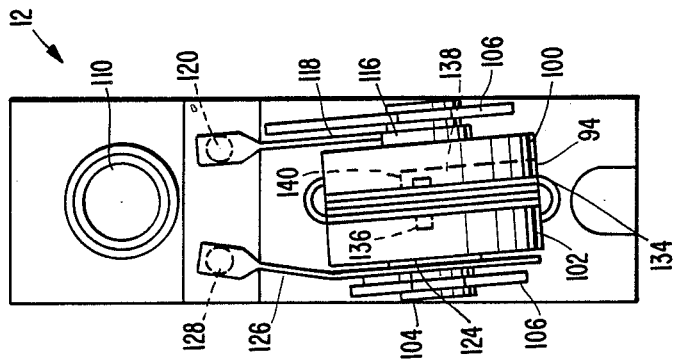
FIG. 2 is a view in end elevation of the metering and pumping unit for the fluid proportioning and mixing unit of FIG. 1.
Figure 3:
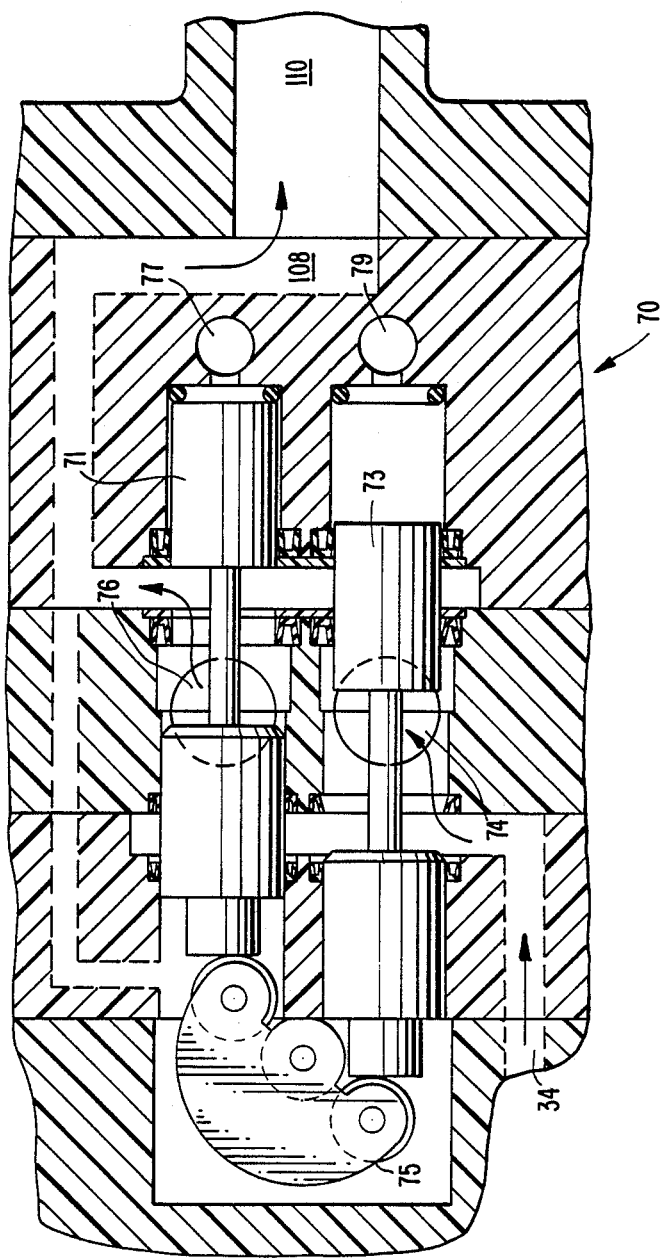
FIG. 3 is a cross-sectional view of the alternator for the fluid proportioning and mixing unit of FIG. 1.

It will be noted from FIG. 2 that the mounting members 106 mount the shaft 104 at an angle so that th drum 94 rotates at an angle. The central axis for the drum is angled sufficiently to align the cables 96 and 98 in the same vertical plane.

As previously indicated, the motive fluid discharged from the motive fluid outlet port 110 is not waste fluid, but is employed in the equalizer container 114 to provide lift height compensation for the solute drawn in through the solute line 38. Without lift height compensation, the pressure of the motive fluid driving the pistons 80 and 82 must not only be sufficient to expel both the solute and drive water from the metering chambers 22 and 24, but it must also be of sufficient magnitude to lift solute from the solute supply container 40 to the solute input port 36. Often the solute supply container 40 is spaced a considerable distance below the fluid proportioning and mixing unit 10, and the vertical length of the solute supply line 38 is substantial. The effects of this lift height are often enough to render inadequate the driving force provided by the motive fluid.

In accordance with the present invention, lift height compensation is achieved by discharging motive fluid into a closed equalizer container 114 by means of the equalizer line 112. The equalizer line is also connected by means of a connector line 130 to the solute input port 36 and the solute line 38. Now, fluid from the equalizer container 114 will rise or fall in the equalizer line 112 to offset the lift height effect of the solute flowing in the solute line 38. Excess liquid in the equalizer container 114 is permitted to pass out through a discharge port 132 should the level of liquid in the equalizer container reach the level of the discharge port.

Referring to FIG. 1, the manner in which lift height compensation affects the metering and pumping unit 12 will be readily appreciated. As piston 80 is powered to the left by motive fluid from the alternator section 70, the piston 82 is drawn to the right by the cable 98 to draw chemical concentrate into metering chamber 24 while forcing motive fluid into the exit conduit 78. A pressure differential existing across the lower piston 82 would require pumping energy to achieve movement, which energy would have to be provided by the upper piston 80. Any additional energy provided by piston 80 will result in a pressure drop in the pressure of the pumped concentrate expelled from the metering chamber 22 to the mixer 14 with respect to the water pressure entering the mixer, and therefore the ratio of concentrate to water leaving the mixer would be reduced over what it would be at zero or minimal draw height for the concentrate or solute. However, by connecting the discharge motive fluid to the solute input port 36 and input line 38, the pressure of the expelled motive fluid is lowered to approximately the same pressure as that of the suction pressure of the solute entering the metering chamber 24. This substantially eliminates differential pressure across the piston 82, and the dilution ratio maintained by the mixer 14 will remain substantially stable regardless of changes in draw or lift height and concentrate density or viscosity.

The energy required to draw concentrate or solute up the solute line 38 is minimized and substantially eliminated by balancing out this lift height effect with motive water fed out through the motive fluid outlet port 110. The motive fluid in the equalizer line 112 is maintained at a height above the level of the fluid in the equalizer container 114 by the partial vacuum existing at the juncture of the solute line 38 and the connector line 130.

Initially, when a new source of concentrate or solute 40 is connected to the metering and pumping unit 12, a momentary break is made between the equalizer line 112 and the connector line 130 to let the motive fluid level in the equalizer line drop to the level of the fluid in the equalizer container 114. Then, with all lines connected, when air is drawn out of the solute line 38 by one of the pistons 80 or 82 to begin the metering of solute, the piston similarly draws air from the equalizer line 112 and the connector line 130. Solute is now drawn up the solute line 38, and motive fluid is drawn up the equalizer line 112. When the solute reaches the juncture of the solute line, the connector line and the solute inlet port 36, a balance is achieved.

The lift height compensation assembly of the present invention provides the added function of minimizing the likelihood of damage to the metering and pumping unit 12 when this unit continues to operate after the solute in the solute supply container 40 is exhausted. When this occurs, air enters the metering chambers 22 and 24 instead of solute, and the unit may be damaged by pumping only air for extended periods. However, by adjusting the level of the fluid within the equalizer container 114 with respect to the level of fluid within the solute supply container 40, the metering and pumping unit can be caused to draw motive fluid from the equalizer container over the lines 112 and 130 instead of solute when the supply of solute in the solute supply container 40 drops below a predetermined level. This insures that air will never be pumped by the unit when the solute supply is depleted.

It has been found that during some periods of operation, the metering and pumping unit 12 tends to draw some air into one of the mixing chambers 22 and 24 in place of solute. This tends to occur when the device first begins to operate, or may occur when the supply of solute in the container 40 is low. If, for example, the metering chamber 22 is filled with a substantial volume of air, rather than solute, damage to the unit can occur when the piston 80 attempts to eject the air through the pressure responsive valve 62. Air will present much less resistance to the travel of the piston 80 than will solute, but the piston 82 is still forced to expel a solid column of motive fluid from the metering chamber 24. When opposed by air, the piston 80 will tend to lunge forward, but the motive fluid in the metering chamber 24 will prevent similar rapid movement of the piston 82. Thus, tremendous stress is placed upon the cables 96 and 98, and these cables will tend to snap.

To protect the cables 96 and 98 against excessive tension, the drum sections 100 and 102 are permitted to rotate relative to one another under certain conditions. The drum section 100 is keyed to the shaft 104, while the drum section 102 is not. The two drum sections are joined by a coil spring 134 of strip spring metal which opposes relative rotation between the two drum sections.

Also, the two drum sections are joined by a pin 136 which is affixed to the drum section 102 and which extends into a slot 138 in the drum section 100. Normally, the spring 124 causes the pin 136 to engage the end 140 of the slot 138, and the bias of the spring strongly opposes any relative movement between the drum sections 100 and 102 which would cause the pin 136 to move along the slot 138 away from the end 140. However, when the tension on the cables 96 and 98 exceeds an allowable tension determined by the bias of the spring 134, the drum sections 100 and 102 are permitted to rotate relative to one another against the bias of the spring to release this tension. The relative rotation permitted by the slot 138 is sufficient to permit a full stroke of one of the pistons 80 or 82 within its associated metering chamber. Thus, if only air is opposing the piston 80 while the piston 82 is being forced to eject motive fluid, the relative rotation between the drum sections 100 and 102 will permit full travel of the piston 80 to the end of the metering chamber 22. At the same time, the bias imposed by the spring 134 will continue to draw the piston 82 to the right to eject all motive fluid from the metering chamber 24. Of course, the reverse will occur if the positions of the pistons 80 and 82 are reversed.

The metering and pumping unit 12 is formed from material which is inert to all chemicals. It has been found that this unit may be molded from epoxy with all conduits being internally formed therein. Even the pistons 80 and 82 and all of the valve members in the solute section 16 can be molded from epoxy so as not to be affected by the chemical solute.

Figure 4:
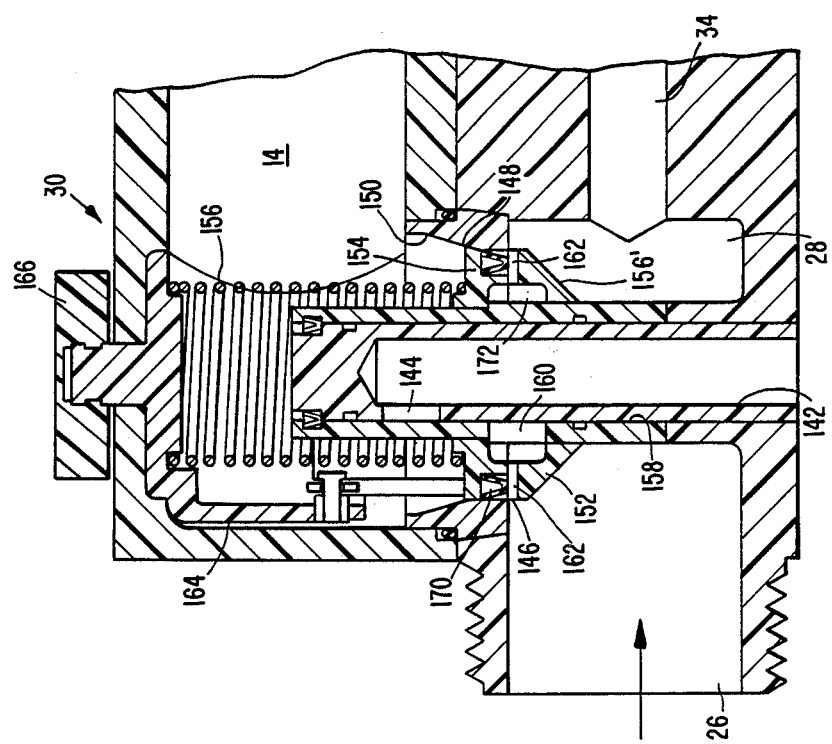
FIG. 4 is a cross-sectional view of a ratio valve assembly for the fluid proportioning and mixing unit of the present invention.

As previously indicated, most of the water from the inlet chamber 28 and all of the metered solute in the metered solute exit conduit 56 is provided to the ratio valve assembly 30 (FIGS. 1 and 4). This valve assembly consists of a central, hollow post 142 having a wide exit slot 144 provided therein. The post 142 extends centrally through an entry opening 146 to the mixer 14. On the mixer side, it will be noted that the entry opening is tapered outwardly, as indicated at 148. It is important to recognize that the angle of taper changes as the entry opening moves into the mixer, and the angle at the exit end 150 is different than that at the entry end.

Mounted for vertical movement on the hollow post 142 is a bobbin member 152. This bobbin member has a laterally extending skirt 154 having a tapered outer surface 156 which conforms to and is adapted to seat against the tapered surface 148 at the entry to the entry opening 146. The bobbin member is spring biased into engagement with the tapered wall at the inlet of the entry opening by a spring 156, and in the absence of water pressure in the inlet chamber 28 sufficient to overcome the bias of the spring 156, the bobbin member 152 will seal the entry opening. This will prevent fluid from the mixer 14 from flowing back into the supply conduit connected to the inlet port 26.

A central shaft 158 extending through the bobbin member 152 receives the hollow post 142 and permits the bobbin to move vertically along the post. When the bobbin closes and seals the entry opening 146, the wall of the central shaft 158 closes the wide exit slot 144 and prevents solute from exiting into the mixer 14. However, a slot 160 is formed in the central shaft 158 of the bobbin, and this slot communicates with radial passages 162 extending to the outer surface of the bobbin. As the bobbin moves upwardly on the central post 142 in response to water pressure in the inlet chamber 28, the slot 160 will begin to move over the slot 144. This will permit solute to pass into the slot 160 and out through the radial conduits 162 to mix with the water which is now passing into the mixer 14 through the entry opening 146 and around the raised skirt of the bobbin member 152. It will be noted that as the bobbin moves higher bringing more of the slot 160 into alignment with the exit slot 144, more solute will be metered into the water passing around the bobbin skirt. Thus, the greater the pressure of the water in the chamber 28, the higher the bobbin moves to pass more water around the bobbin skirt, and the greater the concentrate of solute provided to this water. Thus, regardless of the water pressure, a predetermined water/solute ratio is maintained.

The water solute ratio could be altered by the increased bias applied by the spring 156 to the bobbin member 152 as the spring is compressed, but compensation for this increased bias of the spring is provided by the varying angle of the taper 148 at the exit end 150 for the entry opening. This taper may actually be more in the form of a rounded surface with a curve matching the bias curve of the spring 156 as the spring is compressed. Thus, the taper at the exit end 150 permits an increased volume of water to pass offsetting the increased bias action of the spring, tending to force the bobbin downwardly.

To preset the solute-to-water ratio to be maintained by the ratio valve assembly 30, the bobbin 152 is connected by means of a mechanical linkage 164, indicated in broken lines in FIG. 1, to a control knob 166. The control knob is activated to cause the the hollow post 142. This rotates the slot 160 relative to the exit slot 144 so that only a predetermined horizontal portion of the slot 160 can overlap and communicate with the slot 144. Thus, the ratio of solute which can be mixed with the water is preset. This ratio is maintained as water pressure is increased and the bobbin moves the preset horizontal portion of the slot 160 upwardly over the slot 144. Obviously, the maximum ratio of solute-to-water is set when the complete slot 160 is permitted to communicate with the slot 144 when the bobbin is in its uppermost position. This ratio can be decreased by rotating the bobbin around the hollow post 142 so a lesser extent of the slot can communicate with the slot 144.

The water and solute mixture from the ratio valve assembly 30 then passes through the mixer unit 14 and out through an exit nozzle 168 which is connected to any suitable conduit for the mixture. The entire mixer unit, including the ratio valve assembly 30, can be formed from epoxy or other plastic material which is not subject to attack by most solutes.

In FIG. 4, the configuration of the bobbin member 152 differs slightly from that of FIG. 1. Here, the bobbin member is provided with an O-ring 170 which seals against the surface of the entry opening 146 at the lowermost extent of the tapered surface 148. In this sealed position, both the tapered surface 156 of the bobbin and the radial conduits 162 are in the inlet chamber 28. When pressurized fluid first enters the inlet chamber, it engages the tapered surface 156 and flows through the radial conduits 162 to a chamber 172 within the bobbin formed to communicate between the slot 160 and the radial conduits. The fluid pressure on the tapered surface 156 and within the chamber 172 causes the bobbin to rapidly jump or "pop" upwardly breaking the seal between the O-ring 170 and the surface of the entry opening 146.

For many mixing applications, it is very desirable to provide a fluid proportioning and mixing unit with the capability of accurately mixing a defined volume of chemical concentrate with an extremely large volume of water. For example, it might be desirable to combine a mixer unit capable of handling a water flow of 50-100, or even 200 gallons per minute with a metering and pumping unit of the type illustrated in FIG. 1. However, this metering and pumping unit is a very small, compact unit capable of metering and expelling a volume of concentrate which is small compared to a water flow in the 50 to 100 gallon per minute range.

However, if for example, a 50:1 ratio of water to chemical is required, then it would be desirable to have the capability to combine a mixer handling 50 gallons of water per minute with a small metering and pumping unit which might only have the capability of handling 1 gallon of chemical concentrate per minute. In the past, such a combination has been impossible, for as previously described, in prior units all of the input water was usually employed to drive the metering and pumping unit. Consequently, extremely large metering and pumping units having the ability to withstand tremendous water pressures and to handle high water volumes were required if a high volume fluid proportioning and mixing unit was to be realized.

Figure 5:
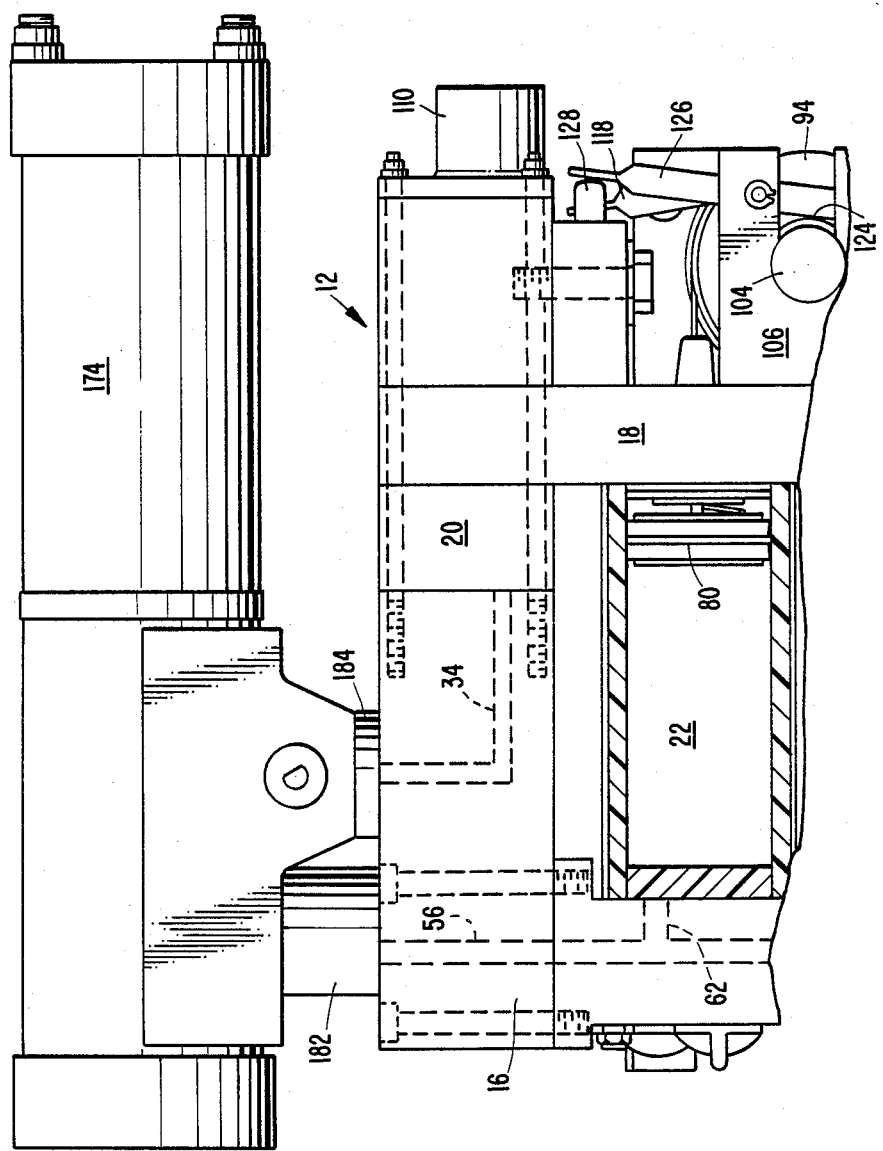
FIG. 5 is a view in side elevation of a section of a high volume embodiment of the proportioning and mixing system of the present invention.

Turning to FIGS. 5-7, a high volume mixer unit 174 designed in accordance with the present invention can be effectively combined with the metering and pumping unit 12 if slight modifications are made in the metering and pumping unit as indicated in FIG. 5.

As will be noted in FIG. 5, the fluid inlet port 26 which communicated with an inlet chamber 28 formed in the bridging section 20 has been eliminated, and the metered solute exit conduit 56 extends upwardly through the bridging section and opens at the top portion thereof. Additionally, the motive fluid supply conduit 34 also extends upwardly to an opening at the top of the bridging section 20. In all other respects, the metering and pumping unit 12 of FIG. 5 is identical to that shown in FIG. 1.

The mixer 174 has a tubular body 176 with a fluid inlet port 178 provided at one end thereof and a fluid outlet port 180 formed at the opposite end thereof. The inlet port 178 is connected to a source of water under pressure or other fluid to be mixed with a chemical concentrate or solute, and the tubular mixer body 176 is dimensioned to handle a desired fluid flow. For example, the mixer body may be dimensioned to handle 50 gallons per minute, 100 gallons per minute, or other suitable volumes. The high volume mixer unit is designed to cooperate with the metering and pumping unit 12 of FIG. 5, and thus includes a metered solute inlet port 182 which communicates with the metered solute exit conduit 56. Also, the mixer is provided with a motive fluid outlet port 184 which communicates with the motive fluid supply conduit 34.

Water, or another base fluid to be mixed with a chemical concentrate flows under pressure into the mixer body 176 through the inlet 178, and some of this fluid is separated from the main stream by a separation chamber 186, and this separated fluid passes as motive fluid through the motive fluid outlet port 184 and into the motive fluid supply conduit 34. The remainder of the fluid passing through the inlet 178 continues through a ratio valve assembly 187 which is formed in the mixer body 176 between the inlet and outlet ports thereof.

The ratio valve assembly 187 is substantially identical in configuration and operation to the ratio valve assembly 30, with the exception that some components are altered in construction to permit the ratio valve assembly to be mounted within the mixer unit 174.

The ratio valve assembly 187 includes a valve seat unit 188 which defines an entry opening 190 for the water or other base fluid. Extending centrally of the tubular mixer body 176 and spaced from the walls thereof is a hollow post 192 which performs the same function as the hollow post 142 of FIG. 1. The base of the post 192 is connected to the metered solute inlet port 182 so that solute metered in the metering and pumping unit 12 passes through the hollow post to a wide exit slot 194 provided therein.

Mounted for horizontal and controlled rotational movement on the hollow post 192 is a bobbin member 196. This bobbin member is substantially identical in configuration to the bobbin member 152 of FIG. 4, and incorporates a tapered outer surface 198 which extends into the entry opening 190.

The portion of the entry opening adjacent the outlet 180 tapers outwardly, as indicated at 198, and as previously described with respect to the ratio valve assembly 30, the taper 198 is designed to offset the effect of a bobbin biasing spring 200. This biasing sprig within the mixer body 176 to the bobbin member 196 and biases an O-ring seal 204 against the tapered surface 198 at the lower extremity thereof.

Like the bobbin member 152, the bobbin member 196 is provided with a slot 206 which cooperates with the exit slot 194 to set and maintain the ratio of chemical concentrate added to the base fluid flowing through the mixer. The slot 206 communicates with a chamber 208 which provides chemical solute to radial conduits 210 formed in the bobbin member.

The bobbin member 196 may be rotated on the hollow post 192 to preset the solute-to-water ratio to be maintained by the ratio valve assembly 187. This is accomplished by an adjusting pin 212 which extends outwardly from the bobbin member 196 and which is received in a threaded follower member 214. The follower member 214 is threaded onto a threaded shaft 216 mounted for rotation on the mixer body 176 The outer ends of the threaded shaft 216 are formed, as indicated at 218, to receive a tool, handle, or other member which will permit the shaft to be rotated to in turn rotate the bobbin member 196 relative to the hollow post 192. A spring 220 extending between the follower 214 and the mixer body 176 operates as an anti-backlash spring to prevent unwanted rotation of the threaded shaft 216.

Once a desired ratio of chemical concentrate is mixed with water flowing through the ratio valve assembly 187, the resultant mixture flows through the spider 202 and out through the mixer outlet 180 to suitable use equipment.

INDUSTRIAL APPLICABILITY

The fluid proportioning and mixing unit 10 operates of a first fluid with a second fluid in a preset dilution ratio. The device also operates effectively to maintain the preset ratio regardless of fluid pressure and flow variations. By combining a relatively small metering and pumping mechanism with a large mixer unit, a large flow capacity is achieved with units formed of plastic material which are simple in design.

We claim:

1. A fluid proportioning unit connectable to a source of a first fluid under pressure and a source of a second fluid to be mixed with said first fluid and adapted to separately provide said first and second fluids in a predetermined proportion to a mixing unit, comprising body means having a first fluid inlet means to receive said first fluid under pressure, motive fluid conduit means formed in said body means in communication with said first fluid inlet means to separate a portion of the first fluid flowing through said first fluid inlet means to provide a motive fluid, said body means including a metering and pumping unit having a first solute section with a second fluid inlet means to receive said second fluid and metered fluid conduit means, said second fluid inlet means and metered fluid conduit means operating to conduct said second fluid within said first solute section, a second motive fluid section formed in opposed, spaces relationship to said first solute section and containing motive fluid inlet and outlet conduits, at least first and second fluid metering means extending between said first solute section and said second motive fluid section and each having a first end adjacent to said first solute section and a second end adjacent to said second motive fluid section, each said fluid metering means operating alternatively and cyclically to draw said second fluid into the first end thereof from said second fluid inlet means and during a subsequent cycle to eject said second fluid through said first end into said metered fluid conduit means, and alternator means connected to said motive fluid conduit means and said motive fluid inlet conduits and operative to selectively provide motive fluid to the second end of one of said first and second metering means to control said first and second metering means, said first and second metering means operating to prevent motive fluid in the second end thereof from mixing with said second fluid in the first end thereof, said body means being formed to isolate said second motive fluid section from said first solute section with no fluid communication therebetween whereby said mixer means separately receives said second fluid from said metered fluid conduit means and first fluid from said first fluid inlet means.

2. The fluid proportioning unit of claim 1 wherein said body means includes said mixing unit, said first fluid inlet means being formed in said mixing unit and said motive fluid conduit means extending from said mixing unit to said metering and pumping unit.

3. The fluid proportioning unit of claim 1 wherein said body means includes a bridging section formed integrally with and extending between said first solute section and said second motive fluid section in substantially parallel relationship with said first and second metering means, said bridging section including said first fluid inlet means and said motive fluid conduit means.

4. The fluid proportioning and mixing unit of claim 3, wherein said body means is molded from chemically inert resins and activators.

5. The fluid proportioning unit of claim 3 wherein said first solute section and said second motive fluid section extend outwardly from said bridging section in spaced, substantially parallel relationship.

6. The fluid proportioning unit of claim 3 wherein said mixing unit is mounted upon said bridging section, said mixing unit including ratio valve means connected to receive said first fluid from said first fluid inlet means and second fluid from said metered fluid conduit means, said ratio valve means operating to mix said second fluid with said first fluid in said mixer means.

7. The fluid proportioning unit of claim 3, wherein each said first and second fluid metering means operate alternatively and cyclically to receive said motive fluid through the second end thereof from a motive fluid inlet conduit and during a subsequent cycle to eject said motive fluid from the second end into a motive fluid outlet conduit.

8. The fluid proportioning unit of claim 7, wherein said first and second metering means each include a metering chamber having a first chamber end adjacent to said first solute section and a second chamber end adjacent to said second motive fluid section and piston means mounted in said metering chamber for reversible, cyclic movement between said first and second chamber ends, and connection means extending between the piston means for said first and second metering means to cause movement of said piston means in opposite directions during each cycle of movement.

9. The fluid proportioning and mixing unit of claim 7, wherein said first and second metering means each include a metering chamber having a first chamber end adjacent to said first solute section and a second chamber end adjacent to said second motive fluid section, piston means mounted in said metering chamber for reversible cyclic movement between said first and second chamber ends, first valve means mounted in said first chamber end and operative to selectively connect said metering chamber with said second fluid inlet means, said first valve means operating between a closed position when said piston means is stationary or moving toward said first chamber end and an open position when said piston means is moving toward said second chamber end, and second valve means mounted in said first chamber end and operative to selectively connect said metering chamber with said metered fluid conduit means, said second valve means operating between a closed position when said piston means is stationary or moving toward said second chamber end and an open position when said piston means is moving toward said first chamber end.

10. The fluid proportioning and mixing unit of claim 9, wherein said body means, piston means and first and second valve means are molded from chemically inert epoxy resins and activators.

11. A fluid proportioning and mixing unit connectable to a source of a first fluid under pressure and a source of a second fluid to be mixed with said first fluid comprising body means having a first fluid inlet means to receive said first fluid under pressure, motive fluid conduit means formed in said body means in communication with said first fluid inlet means to direct at least a portion of the first fluid flowing through said first fluid inlet means to provide a motive fluid, said body means including a metering and pumping unit having a second fluid inlet means to receive said second fluid, motive fluid outlet means, and fluid metering means connected to receive said motive fluid, said fluid metering means operating during a first cycle to receive motive fluid and during a second subsequent cycle to eject motive fluid to said motive fluid outlet means, a fluid equalizer container means mounted in spaced relationship below said metering and pumping unit, a fluid equalizer conduit means connected between said motive fluid outlet means and said fluid equalizer container means, said second fluid source being mounted in spaced relationship below said metering and pumping unit, solute input conduit means connected between said second fluid source and said second fluid inlet means, and pressure equalizing conduit means connecting said motive fluid outlet means and equalizer conduit means to said second fluid inlet means and solute input conduit means.

12. A fluid proportioning and mixing unit connectable to a source of a first fluid under pressure and a source of a second fluid to be mixed with said first fluid comprising body means having a first fluid inlet means to receive said first fluid under pressure, motive fluid conduit means formed in said body means in communication with said first fluid inlet means to separate a portion of the first fluid flowing through said first fluid inlet means to provide a motive fluid, said body means including a metering and pumping unit having a first solute section with a second fluid inlet means to receive said second fluid and metered fluid conduit means, a second motive fluid section formed in opposed, spaced relationship to said first solute section and containing motive fluid inlet and outlet conduits, at least first and second fluid metering means extending between said first solute section and said second motive fluid section and said second motive fluid section and each having a first end adjacent to said first solute section and a second end adjacent to said second motive fluid section, each said fluid metering means operating alternatively and cyclically to draw said second fluid into the first end thereof from said second fluid inlet means and during a subsequent cycle to eject said second fluid through said first end into said metered fluid conduit means, alternator means connected to said motive fluid means and said motive fluid inlet conduits and operative to control said first and second metering means, and mixer means connected to receive second fluid from said metered fluid conduit means and first fluid from said first fluid inlet means, said first fluid inlet means being formed in said mixer means, said motive fluid conduit means extending from said mixer means to said metering and pumping unit.

13. A fluid proportioning and mixing unit connectable to a source of a first fluid under pressure and a source of a second fluid to be mixed with said first fluid comprising a metering and pumping means having a solute input means to receive said second fluid and fluid metering means operative in response to motive fluid to draw a small measured volume of said second fluid from said solute input means and to subsequently eject said measured volume of said second fluid, motive fluid supply means connected to said fluid metering means to provide motive fluid to operate said fluid metering means and metered fluid conduit means connected to receive the measured volume of said second fluid ejected by said fluid metering means, and mixing means connected to said metering and pumping means and having a fluid inlet means to receive said first fluid and a fluid outlet means spaced from said fluid inlet means, said mixing means being adapted to permit a volume of fluid flow per minute between said fluid input and fluid outlet means which is many times greater than the volume of fluid flow per minute of said second fluid drawn by said fluid metering means from said solute input means, and including a ratio valve means mounted therein between said fluid input and outlet means, said ratio valve means being connected to receive said second fluid from said metered fluid conduit means and operating in response to the fluid pressure of said first fluid to mix said second fluid with said first fluid, and motive fluid divider means mounted in said mixing means between said fluid inlet means and ratio valve means, said fluid divider means being connected to said motive fluid supply means and operating to direct a portion of said first fluid as a motive fluid to said motive fluid supply means.

14. The fluid porportioning and mixing unit of claim 13 wherein said ratio valve means includes a valve inlet port connected to receive said first fluid from said first fluid inlet means, said valve inlet port having a port defining wall which inclines outwardly to an end communicating with said mixer means, a hollow solute post connected to receive said second fluid from said metered fluid conduit means and extending into said mixer means through said valve inlet port in spaced relationship to the port defining wall, said hollow solute post having a closed terminal end and a solute metering slot means formed in spaced relationship to said closed terminal end to permit said second fluid to flow outwardly form said hollow solute post, and bobbin means mounted on said hollow solute post for both rotational and longitudinal movement, said bobbin means having a shaft receiving opening defined by a perimeter wall to receive said hollow solute post and a skirt means with an outwardly inclined wall formed at one end thereof, said skirt means having an inner chamber with outlet opening means extending from said inner chamber, the bobbin means being adapted to move longitudinally relative to said hollow solute post in response to the pressure of said first fluid from a closure position where said bobbin means engages said port defining wall to close said inlet port to said frist fluid, said perimeter wall being formed to close said solute metering slot when said bobbin means is in said closure position.

15. The fluid proportioning and mixing unit of claim 14, wherein said bobbin means is oriented on said hollow solute post so that longitudinal movement of said bobbin means from said closure position will bring said bobbin slot into communication with said solute metering slot.

16. The fluid proportioning and mixing unit of claim 15, wherein ratio setting means are connected to said bobbin means and operate to rotate said bobbin means on said hollow solute post to preset the amount of said second fluid to be added to said first fluid by said ratio valve means, the rotational position of said bobbin means operating to determine the maximum extent of communication between said bobbin and solute metering slots permitted by the longitudinal movement of said bobbin.

17. The fluid proportioning and mixing unit of claim 16, wherein said ratio valve means includes bias spring means which is compressed by movement of said bobbin means from said closure position operating to space the inclined wall of said skirt means relative to the port wall to permit a volume of said first fluid determined by said spacing to pass between said port wall and the inclined wall of said skirt means.

18. The fluid proportioning and mixing unit of claim 17, wherein said port wall is configured to alter the spacing between said port wall and the inclined wall of said skirt means to compensate for the increased bias applied to said bobbin means by said bias spring means as the bias spring means is compressed.

19. A fluid proportioning and mixing unit connectable to a source of a first fluid under pressure and a source of a second fluid to be mixed with said first fluid comprising body means having a first fluid inlet means to receive said first fluid under pressure, motive fluid conduit means formed in said body means in communication with said first fluid inlet means to separate a portion of the first fluid flowing through said first fluid inlet means to provide a motive fluid, said body means including a metering and pumping unit having a first solute section with a second fluid inlet means to receive said conduit means, a second motive fluid section formed in opposed, spaced relationship to said first solute section and containing motive fluid inlet and outlet conduits, at least first and second fluid metering means extending between said first solute section and said second motive fluid section and each having a first end adjacent to said first solute section and a second end adjacent to said second motive fluid section, each said fluid metering means operating alternatively and cyclically to draw said second fluid into the first end thereof from said second fluid inlet means and during a subsequent cycle to eject said second fluid through said first end into said metered fluid conduit means an also operating alternately and cylically to receive said motive fluid through the second end thereof from a motive fluid inlet conduit and during a subsequent cycle to eject said motive fluid form the second end into a motive fluid outlet conduit, said first and second metering means each including a metering chamber having a first chamber end adjacent to said first solute section and a second chamber end adjacent to said second motive fluid section and piston means mounted in said metering chamber for reversible, cyclic movement between said first and second chamber ends, and connection means extending between the piston means for said first and second metering means to cause movement of said piston means in opposite directions during each cycle of movement, said connection means including a drum mounted for rotation on said body means having first and second drum sections mounted for relative rotation in opposite directions and biasing spring means connected between said first and second drum sections, said biasing spring means operating to oppose relative rotation of said drum sections, and cable means extending between said drum and said piston means, said cable means including a first cable connected between said first drum section and one of said piston means and a second cable connected between said second drum section and the remaining piston means, alternator means connected to said motive fluid conduit means and said motive fluid inlet conduits and operative to control said first and second metering means, and mixer means connected to receive said second fluid from said metered fluid conduit means and said first fluid from said first fluid inlet means.

20. The fluid proportioning and mixing unit of claim 19, wherein the metering chambers for said first and second metering means extend in superimposed relationship between said first solute section and said second motive fluid section, said drum being angularly mounted upon said second motive fluid section to orient said first and second cables in spaced, superimposed relationship.

21. A fluid proportioning and mixing unit connectable to a source of a first fluid under pressure and a source of a second fluid to be mixed with said first fluid comprising body means having a first fluid inlet means to receive said first fluid under pressure, motive fluid conduit means formed in said body means in communication with said first fluid inlet means to separate a portion of the first fluid flowing through said first fluid inlet means to provide a motive fluid, said body means including a metering and pumping unit having a first solute section with a second fluid inlet means to receive said second fluid and metering fluid conduit means, a second motive fluid section formed in opposed, spaced relationship to said first solute section and containing motive fluid inlet and outlet conduits, at least first and second fluid metering means extending between said first solute section and said second motive fluid section and each having a first end adjacent to said first solute section and a second end adjacent to said second motive fluid section, each said fluid metering means operating alternatively and cyclically to draw said second fluid into the first end thereof from said second fluid inlet means and during a subsequent cycle to eject said second fluid through said first end into said metered fluid conduit means, alternator means connected to said motive fluid conduit means and said motive fluid inlet conduits and operative to control said first and second metering means, mixer means connected to receive said second fluid from said metered fluid conduit means and said first fluid from said first fluid inlet means, a fluid equalizer container means mounted in spaced relationship below said metering and pumping unit, said metering and pumping unit including motive fluid outlet means on said second motive fluid section to receive motive fluid from said motive fluid outlet conduits, a fluid equalizer conduit means connected between said motive fluid outlet means and said fluid equalizer container means, said second fluid source being mounted in spaced relationship below said metering and pumping unit, solute input conduit means connected between said second fluid source and said second fluid inlet means, and pressure equalizing conduit means connecting said fluid equalizer conduit means at said motive fluid outlet means to said solute input conduit at said second fluid input means.

22. The fluid proportioning and mixing unit of claim 21, wherein each said first and second fluid metering means operate alternatively and cyclically to receive said motive fluid through the second end thereof from a motive fluid inlet conduit and during a subsequent cycle to eject said motive fluid from the second end into a motive fluid oulet conduit.

23. The fluid proportioning and mixing unit of claim 22, wherein said first and second metering means each include a metering chamber having a first chamber end adjacent to said first solute section and a second chamber end adjacent to said second motive fluid section, piston means mounted in said metering chamber for reversible cyclic movement between said first and second chamber ends, first valve means mounted in said first chamber end and operative to selectively connect said metering chamber with said second fluid inlet means, said first valve means operating between a closed position when said piston means is stationary or moving toward said first chamber end and an open position when said piston means is moving toward said second chamber end, and second valve means mounted in said first chamber end and operative to selectively connect said metering chamber with said metered fluid conduit means, said second valve means operating between a closed position when said piston means is stationary or moving toward said second chamber end and an open position when said piston means is moving toward said first chamber end.

24. A fluid proportioning and mixing unit connectable to a source of a first fluid under pressure and a source of a second fluid to be mixed with said first fluid comprising body means having a first fluid inlet means to receive said first fluid under pressure, motive fluid conduit means formed in said body means in communication with said first fluid inlet means to separate a portion of the first fluid flowing through said first fluid inlet means to provide a motive fluid, said body means including a metering and pumping unit having a first solute section with a second fluid inlet means to receive said second fluid and metered fluid conduit means, a second motive fluid section formed in opposed, spaced relationship to said first solute section and containing motive fluid inlet and outlet conduits, at least first and second fluid metering means extending between said first solute section and said second motive fluid section and each having a first end adjacent to said first solute section and a second end adjacent to said second motive fluid section, each said fluid metering means operating alternatively and cyclically to draw said second fluid into the first end thereof from said second fluid inlet means and during a subsequent cycle to eject said second fluid through said first end into said metered fluid conduit means, alternator means connected to said motive fluid conduit means and said first and second metering means, and mixer means connected to receive said second fluid form said metered fluid conduit means and said first fluid from said first fluid inlet means, with said first fluid inlet means being formed in said metering and pumping unit, said mixer means including ratio valve means having a valve inlet port connected to receive said first fluid from said first fluid inlet means, said valve inlet port having a port defining wall which inclines outwardly to an end communicating with said mixer means, a hollow solute post connected to receive said second fluid from said metered fluid conduit means and extending into said mixer means through said valve inlet port in spaced relationship to the port defining wall, said hollow solute post having a closed terminal end and a solute metering slot means formed in spaced relationship to said closed terminal end to permit said second fluid to flow outwardly from said hollow solute post, and bobbin means mounted on said hollow solute post for both rotational and longitudinal movement, said bobbin means having a shaft receiving opening defined by a perimeter wall to receive said hollow solute post and a skirt means with an outwardly inclined wall formed at one end thereof, said skirt means having an inner chamber with outlet opening means extending from said inner chamber outwardly of said bobbin means, said perimeter wall including a bobbin slot communicating with said inner chamber, said ratio valve means operating to mix said second fluid with said first fluid in said mixer means.

25. The fluid porportioning and mixing unit of claim 24, wherein said bobbin means is adapted to move longitudinally relative to said hollow solute post in response to the pressure of said first fluid from a closure position where said bobbin means engages said port defining wall to close said inlet port to said first fluid, said perimeter wall being formed to close said solute metering slot when said bobbin means is in said closure position.

26. The fluid proportioning and mixing unit of claim 25, wherein said bobbin means is oriented on said hollow solute post so that longitudinal movement of said bobbin means from said closure position will bring said bobbin slot into communication with said solute metering slot.

27. The fluid proportioning and mixing unit of claim 15, wherein ratio setting means are connected to said bobbin means and operate to rotate said bobbin means on said hollow solute post to preset the amount of said second fluid to be added to said first fluid by said ratio valve means, the rotational position of said bobbin means operating to determine the maximum extent of communication between said bobbin and solute metering slots permitted by the longitudinal movement of said bobbin means.

28. The fluid proportioning and mixing unit of claim 27, wherein said ratio valve means includes bias spring means which is compressed by movement of said bobbin means from said closure position, the movement of said bobbin means from said closure position operating to space the inclined wall of said skirt means relative to the port wall to permit a volume of said first fluid determined by said spacing to pass between said port wall and the inclined wall of said skirt means.

29. The fluid proportioning and mixing unit of claim 17, wherein said port wall is configured to alter the spacing between said port wall and the inclined wall of said skirt means to compensate for the increased bias applied to said bobbin means by said bias spring means as the bias spring means is compressed.

* * * * *